No. 743,513. PATENTED NOV. 10, 1903.
C. W. JEFFERSON.
MACHINE FOR MAKING HOLLOW FORMS FROM PLIABLE COMPOUNDS.
APPLICATION FILED FEB. 3, 1902.
NO MODEL.
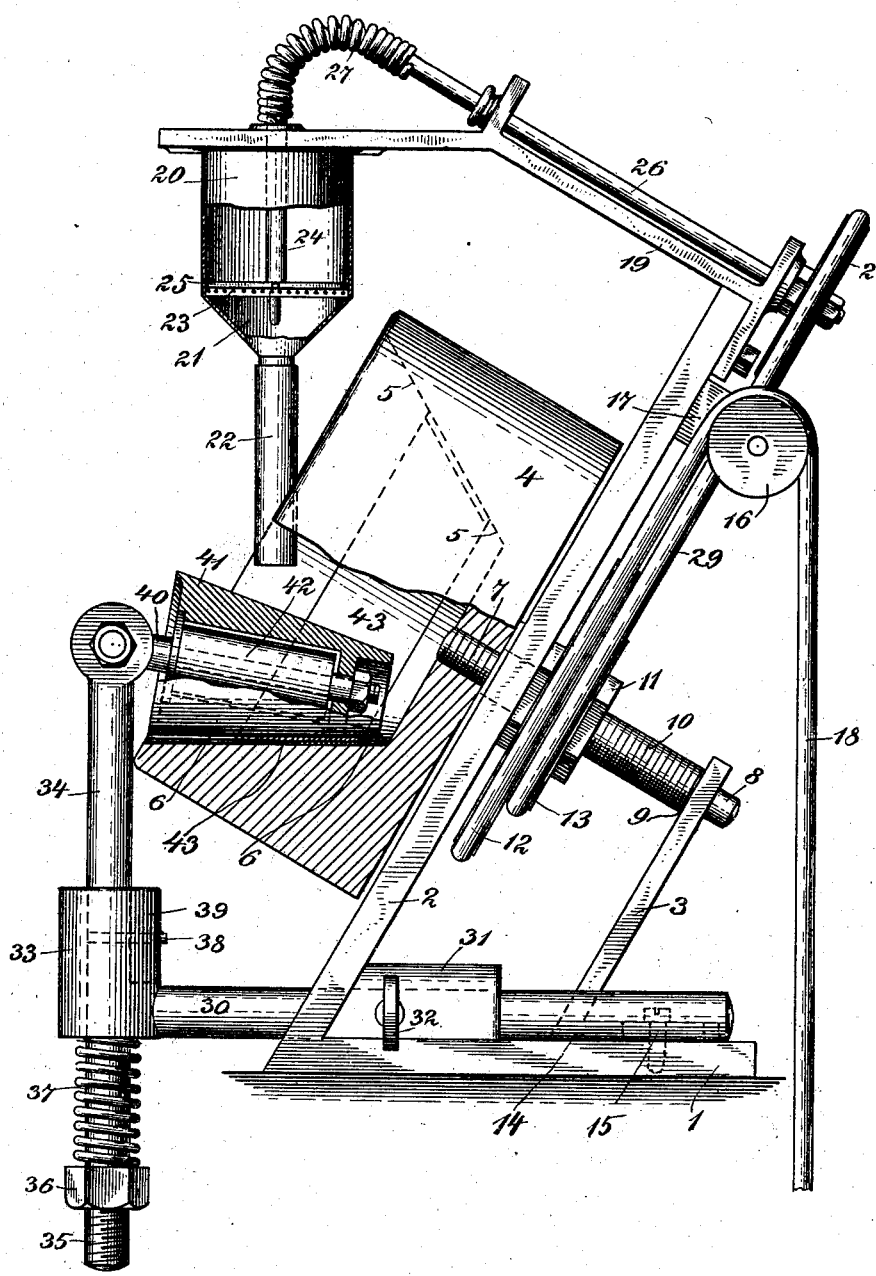
WITNESSES:
INVENTOR
Charles Wilkin Jefferson
BY
Kenyon & Kenyon
ATTORNEYS No. 743,513. Patented November 10, 1903.

UNITED STATES PATENT OFFICE.

CHARLES WILKIN JEFFERSON, OF SCHENECTADY, NEW YORK, ASSIGNOR TO MICA INSULATOR COMPANY, A CORPORATION OF NEW JERSEY.

MACHINE FOR MAKING HOLLOW FORMS FROM PLIABLE COMPOUNDS.

SPECIFICATION forming part of Letters Patent No. 743,513, dated November 10, 1903.

Application filed February 3, 1902. Serial No. 92,301. (No model.)

*To all whom it may concern:*

Be it known that I, CHARLES WILKIN JEFFERSON, a citizen of Great Britain, and a resident of Schenectady, county of Schenectady, and State of New York, have invented a new and useful Machine for Making Built-Up Articles from a Pliable Compound, of which the following is a specification.

My invention is particularly adapted for the manufacture of hollow forms to be made by the compression of the pliable material into the desired shape and also wherein the material is of such a nature as to be melted or softened by the application of heat.

My invention has been found especially adapted for the manufacture of hollow insulators composed of scales of mica bound together by shellac or a similar composition in which the mica is laid on, and said composition is fed to the inner wall of the forming-die in a ground or powdered state and then by heat and pressure is partially melted and pressed into a compact mass with the scales of mica.

In the accompanying drawing I have shown a partial vertical section of a machine illustrating one embodiment of my invention.

1 is the base of the machine.

2 and 3 are two upwardly-extending supports from the base 1 for most of the operating parts of the machine. These two supports 2 and 3 are preferably parallel, and the front support 2 may be cast integral with the base 1, as shown in the drawing.

4 is the hollow die-chamber or mold, in which the hollow forms are to be made by pressure of the compound against the inner wall 5 of said die. The lowermost portion 6 of the wall 5 is preferably horizontal to allow for the best distribution of the material or materials in making the form or insulator. The inner wall 5 is preferably of metal, so as to be a good heat-conductor, and the entire die 4 may be cast of one piece of metal. When the wall 5 converges toward the bottom of the die 4, it will have to slant backward, as shown, in order that the lowermost portion 6 of the wall 5 be horizontal. In such case the standards or supports 2 and 3 will also slope backward, the shaft or spindle 7 of the die 4 sloping downward and backward and being journaled in the supports 2 and 3. The journal 8 of the spindle 7 in the support 3 is of less diameter than the adjoining part of the spindle, forming an annular shoulder 9, which bears upon the inner side of the support 3. The part 10 of the spindle 4 inside the support 3 is screw-threaded for the engagement of a surrounding adjusting-nut 11.

12 and 13 are two pulleys keyed upon the spindle or shaft 7 between the support 2 and the nut 11 and held in place by said nut.

The support 3 is provided with a horizontal extension 14, resting upon the base 1, which is adjustably secured to said base by a slot-and-screw connection 15, so that the support 3 may be adjusted on the spindle 7 and also so that said spindle and the die 4 may be readily removed and replaced by another.

16 is a pulley journaled to a bracket 17 on the support 2 above the pulleys 12 and 13, and 18 is a belt passing over pulleys 16 and 12 and communicating revolution to said pulleys from a driving-pulley (not shown) below the machine.

19 is a bracket extending from the top of the support 2 and forward from the same to a point above the opening in the die 4. Suspended from the forward end of said bracket 19 is a receptacle 20, having a funnel-shaped bottom 21, to the contracted outlet of which is connected an outlet tube or chute 22.

23 is a sieve-diaphragm extending across the receptacle 20, where it begins to contract into a funnel.

24 is a spindle extending vertically from the center of the sieve 23 through the receptacle 20 and provided with laterally-extending arms 25, which rest upon the sieve 23.

26 is a shaft journaled in bearings in the bracket 19, and the forward end of said shaft 26 is connected by a flexible shaft 27 with the upper end of the spindle 24. A pulley 28 is secured to the rear end of the shaft 26, and this pulley 28 is connected by a belt 29 with the pulley 13. The rotation of the pulley 28 by the pulley 13 and belt 29 will cause the shafts 26 and 27 and spindle 24 to revolve and also rotate the arms 25 over the sieve. The revolution of the above-named devices will be transmitted from the revolution of the spindle 10, which is caused by the belt 18 and pulleys 16 and 12, as above stated.

30 is a horizontal adjustable support passing loosely through a sleeve 31 of the base 1 and adjusted at any point desired by a binding-screw 32, passing through the wall of said sleeve. The front end of the support 30 is provided with a vertical sleeve 33, through which passes loosely a standard 34. The lower part of this standard 34 is screw-threaded, as at 35, for the engagement of a nut 36, and a coil-spring 37 encircles the standard 34 between the lower end of the sleeve 33 and the nut 36. A pin 38, extending laterally outward from the support 34 and through a vertical slot 39 in the sleeve 33, permits vertical play of said support, but prevents its turning in the sleeve. Removably secured to the upper end of the support 33 and radially adjustable upon the same, so that it may be adjusted to any angle with said support, is a spindle 40, and journaled upon this spindle is a friction-roller 41, entering in the die 4 and bearing down on the lower part 6 of the wall 5. This roller 41, by means of the nut 36 and spring 37, as above described, serves to increase or diminish the pressure of said roller on the wall 5 of the die. The spring causes a yielding pressure of the roller sufficient to allow a material to enter between it and the inner wall of the die. An electric resistance-coil 42, fitted within the roller 41 and surrounding the spindle 40 and which may be connected with any electric circuit, serves to heat the roller 41 and to partially melt and soften any material which may be so affected by heat that is introduced between said roller and the inner wall 5 of the die 4. If the wall 5 of the die 4 converges at its inner end so that the recess of the die is conical in shape, as shown in the drawing, it is preferable to use a conical roller 41, as shown, as the outer surface of the latter will better conform to the wall 5 of the former.

If it be desired to form a compact and pressed conically-shaped ring for insulation—of mica scales and powdered shellac, for example—a little adhesive material is first spread over the wall 5 of the die 4, and it is slowly revolved by the means above described while the operator deposits over said wall 5 the mica scales. The mica passes between the roller 41 and the wall 5 and is pressed. Powdered shellac from the receptacle 20 then drops through the chute 22 onto the layer of mica and it also passes between the roller 41 and the wall 5 of the die and by means of the heat from said roller is partly melted and softened, and thus pressed into a compact mass with the mica. Alternate layers of mica and powdered shellac may thus be deposited upon the wall 5 and rolled and compressed together at successive revolutions of said die until the desired thickness of the ring is attained. The introduction of the material between the roller 41 and the wall 5 of the die 4 gradually raises the roller 41 from the wall 5 against the action of the spring 37. I have shown in the drawing the roller so raised and a ring of insulation 43 made by the above-described mechanism.

From the above it will be seen that my invention provides means not only for making hollow forms from mica scales and shellac, but it also provides means for building up articles from other structural substances and fusible cement.

My invention in its broader aspects is not limited to the precise construction shown and described, nor to the precise construction by which it may be carried into effect, as many changes other than those suggested may be made therein without departing from the main principles of my invention.

What I claim as new, and desire to secure by Letters Patent, is—

1. A new and useful machine for making hollow forms from a pliable compound, consisting of a hollow die or chamber, a pressure device within said die, means for bearing its outer surface toward the inner wall of the die, and means for causing movement relative to each other of said device and die, whereby the compound may be pressed and molded between said die and device, with the pressed surfaces of the compound constituting the inner and outer walls of the form.

2. A new and useful machine for making hollow forms from a pliable compound, consisting of a hollow die or chamber, a pressure device within said die, means for yieldingly bearing its outer surface toward the inner wall of the die, and means for causing movement relative to each other of said device and die, whereby the compound may be pressed and molded between said die and device, with the pressed surfaces of the compound constituting the inner and outer walls of the form.

3. A new and useful machine for making hollow forms from a pliable compound, consisting of a hollow die or chamber, having an annular inner wall, a pressure device within said die, means for bearing its outer surface toward the inner wall of the die, and means for causing movement relative to each other of said device and die, whereby the compound may be pressed and molded between said die and device, with the pressed surfaces of the compound constituting the inner and outer walls of the form.

4. A new and useful machine for making hollow forms from a pliable compound, consisting of a hollow die or chamber, a pressure device within said die, having a curved outer surface and means for bearing it toward the inner wall of the die, and means for causing movement relative to each other of said device and die, whereby the compound may be pressed and molded between said die and device, with the pressed surfaces of the compound constituting the inner and outer walls of the form.

5. A new and useful machine for making hollow forms of a pliable compound, consisting of a hollow die or chamber, having an annular inner wall, a pressure device within said die, having a curved outer surface and means for bearing it toward the inner wall of the die, and means for causing movement relative to each other of said device and die, whereby the compound may be pressed and molded between said die and device, with the pressed surfaces of the compound constituting the inner and outer walls of the form.

6. A new and useful machine for making hollow forms from a pliable compound, consisting of a hollow die or chamber having an annular inner wall, a pressure device having a curved outer surface within said die, and means for bearing said outer surface toward the inner wall of the die, and means for causing the revolution of said die or device, whereby the compound may be pressed and molded between said die and device, with the pressed surfaces of the compound constituting the inner and outer walls of the form.

7. A new and useful machine for making hollow forms from a pliable compound, consisting of a hollow die or chamber having an annular inner wall, a pressure-roller within said die, means for bearing it toward the inner wall of the die, and means for causing the revolution of said die or roller, whereby the compound may be pressed and molded between said die and roller, with the pressed surfaces of the compound constituting the inner and outer walls of the form.

8. A new and useful machine for making hollow forms from a pliable compound, consisting of a hollow die or chamber having an annular inner wall, a pressure-roller within said die, means for bearing it toward the inner wall of the die, and means for causing the revolution of said die, whereby the compound may be pressed and molded between said die and roller, with the pressed surfaces of the compound constituting the inner and outer walls of the form.

9. A new and useful machine for making hollow forms from a pliable compound, consisting of a hollow die or chamber having an annular inner wall, a pressure device having a curved outer surface within said die, means for bearing said outer surface toward the inner wall of the die, means for causing the revolution of said die or device, and means for heating said device, whereby the compound may be melted and pressed between said die and device, with the pressed surfaces of the compound constituting the inner and outer walls of the form.

10. A new and useful machine for making hollow forms from a pliable compound, consisting of a hollow die or chamber having an annular inner wall, a pressure device having a curved outer surface within said die, means for bearing said outer surface toward the inner wall of the die, means for causing the revolution of said die or device, and an electric resistance-coil within said device, whereby the compound may be melted and pressed between said die and device, with the pressed surfaces of the compound constituting the inner and outer walls of the form.

11. A new and useful machine for making hollow forms from a pliable compound, consisting of a hollow die or chamber, a pressure device within said die, means for bearing its outer surface toward the inner wall of the die, and means for causing movement relative to each other of said device and die, and means for feeding the compound to the inner walls of said die, whereby the compound may be fed, pressed and molded between said die and device, with the pressed surfaces of the compound constituting the inner and outer walls of the form.

12. A new and useful machine for making hollow forms from a pliable compound, consisting of a hollow die or chamber, a pressure device within said die, means for bearing its outer surface toward the inner wall of the die, and means for causing movement relative to each other of said device and die, a receptacle, a delivery-chute leading from the same and to the die, and a sieve near the bottom of said receptacle and above the chute, whereby a compound may be sifted, and then fed and pressed between said die and device, with the pressed surfaces of the compound constituting the inner and outer walls of the form.

13. A new and useful machine for making hollow forms from a pliable compound, consisting of a hollow die or chamber, a pressure device within said die, means for bearing its outer surface toward the inner wall of the die, and means for causing movement relative to each other of said device and die, a receptacle, a delivery-chute leading from the same and to the die, and a sieve near the bottom of said receptacle and above the chute, and agitating-arms above said sieve, whereby the compound may be sifted, and then fed and pressed between said die and device, with the pressed surfaces of the compound constituting the inner and outer walls of the form.

14. A new and useful machine for making built-up articles from a pliable compound containing a fusible cement, consisting of a rotatable mold, means for applying the said compound to said mold, and means for applying heat and pressure to said compound and mold, whereby the compound may be pressed and molded.

15. A new and useful machine for making built-up articles from a pliable compound containing a fusible cement, consisting of a hollow rotatable mold, means for applying the said compound to the interior of said mold and means for applying heat and pressure to said compound and mold, whereby the compound may be pressed and molded into a hollow form.

16. A machine for making built-up articles of a structural substance and fusible cement, consisting of a rotatable hollow mold adapted to receive layers of said substance, means for applying the fusible cement when in a divided state to each layer of said substance, and means within the mold for applying heat and pressure to each layer.

17. A machine for making built-up articles of a structural substance and a fusible cement, comprising a rotatable support, a mold removably mounted on said support and adapted to receive layers of said substance, means within the mold for applying the cementing material to each layer, and means for applying heat and pressure to each layer.

18. A machine for making built-up articles of mica and fusible cement comprising a rotatable support, a mold removably mounted on said support and adapted to receive the mica layers, means for supplying divided fusible cementing material to each layer, and means for applying heat and pressure to each layer while on said mold.

In testimony whereof I have signed my name to this specification in the presence of two subscribing witnesses.

CHARLES WILKIN JEFFERSON.

Witnesses:
ALLAN H. JACKSON,
HOMER STRONG.